(12) United States Patent
Kulhavy

(10) Patent No.: US 6,360,838 B1
(45) Date of Patent: Mar. 26, 2002

(54) SYSTEM FOR BALANCING A TWO-WHEELED VEHICLE AT REST

(75) Inventor: Joseph A. Kulhavy, Garland, TX (US)

(73) Assignee: Skye Associates, LLC, Bel Air, MD (US)

( * ) Notice: Subject to any disclaimer, the term of this patent is extended or adjusted under 35 U.S.C. 154(b) by 0 days.

(21) Appl. No.: 09/624,496

(22) Filed: Jul. 21, 2000

Related U.S. Application Data
(60) Provisional application No. 60/175,573, filed on Jan. 11, 2000.

(51) Int. Cl.[7] ............................ B62K 17/00; G01C 19/02
(52) U.S. Cl. .................. 180/219; 180/282; 280/755; 74/5.22
(58) Field of Search ...................... 280/755; 180/219, 180/21, 209, 282; 74/5.22; 200/61.52; 114/121, 122; 105/141

(56) References Cited

U.S. PATENT DOCUMENTS

| | | |
|---|---|---|
| 796,893 A | 8/1905 | Brennan |
| 907,907 A | 12/1908 | Sperry |
| 960,838 A | 6/1910 | Daugherty |
| 991,485 A | 5/1911 | Darrow |
| 1,048,817 A | 12/1912 | Falcke |
| 1,150,311 A | 8/1915 | Sperry |
| 1,236,993 A | 8/1917 | Sperry et al. |
| 1,358,258 A | 11/1920 | Sperry |
| 1,362,024 A * 12/1920 | McKee ................. 180/219 |
| 1,452,482 A | 4/1923 | Sperry |
| 1,513,143 A | 10/1924 | Welch et al. |
| 1,558,514 A | 10/1925 | Sperry |
| 1,778,734 A | 10/1930 | Sperry |
| 1,800,365 A | 4/1931 | Sperry |
| 1,947,119 A | 2/1934 | Walter ............... 105/141 |
| 2,178,351 A | 10/1939 | Tetens ............... 105/141 |
| 3,124,007 A | 3/1964 | Swinney ............. 74/5.22 |
| 3,373,832 A | 3/1968 | Summers ............ 180/30 |
| 3,410,357 A | 11/1968 | Summers ............ 180/30 |
| 3,465,840 A | 9/1969 | Summers ............ 180/30 |
| 3,511,454 A | 5/1970 | Hamilton ............ 244/79 |
| 3,683,818 A * 8/1972 | Meir et al. .......... 105/164 |
| 3,756,338 A | 9/1973 | Goodridge .......... 180/30 |
| 3,787,066 A | 1/1974 | Hautier ............... 280/217 |
| 3,804,455 A * 4/1974 | Gorski ............... 180/21 |
| 4,261,278 A | 4/1981 | Gaudin ............... 114/126 |
| 4,272,094 A | 6/1981 | Patrin ................ 280/217 |
| 4,363,022 A | 12/1982 | Manacci ............. 340/73 |
| 4,691,798 A | 9/1987 | Engelbach .......... 180/209 |
| 4,712,806 A | 12/1987 | Patrin ................ 280/217 |
| 4,951,514 A * 8/1990 | Gubin ................ 74/5.37 |
| 5,314,034 A * 5/1994 | Chittal .............. 180/21 |
| 5,401,055 A * 3/1995 | Pham ................ 280/755 |
| 5,426,571 A | 6/1995 | Jones ................ 362/72 |
| 5,603,239 A | 2/1997 | Chong .............. 74/5.22 |
| 5,684,244 A | 11/1997 | Jones ................ 73/1 |
| 5,811,656 A | 9/1998 | Jones ................ 73/1.75 |
| 5,820,439 A | 10/1998 | Hair, III ............ 446/233 |
| 5,839,386 A | 11/1998 | Frieling et al. ...... 114/121 |
| 5,960,900 A * 10/1999 | Cheng ............... 180/21 |
| 6,112,840 A * 9/2000 | Forbes .............. 280/217 |

FOREIGN PATENT DOCUMENTS

| | | |
|---|---|---|
| FR | 002678230 A1 * | 12/1992 |
| FR | 2693970 A1 * | 1/1994 |
| JP | 59102663 A * | 6/1984 |

* cited by examiner

*Primary Examiner*—Lanna Mai
*Assistant Examiner*—Ruth Ilan
(74) *Attorney, Agent, or Firm*—Christie, Parker & Hale, LLP

(57) ABSTRACT

A system for balancing two-wheeled vehicles when approaching rest or when at rest is provided. The system includes a spinning gyro rotor which is precessed upon the sensing of incipient tipping of the vehicle when the vehicle is at rest or approaching rest for generating a force for preventing such tipping. The system may be packaged in a small module that can be mounted on existing two-wheeled vehicles.

39 Claims, 8 Drawing Sheets

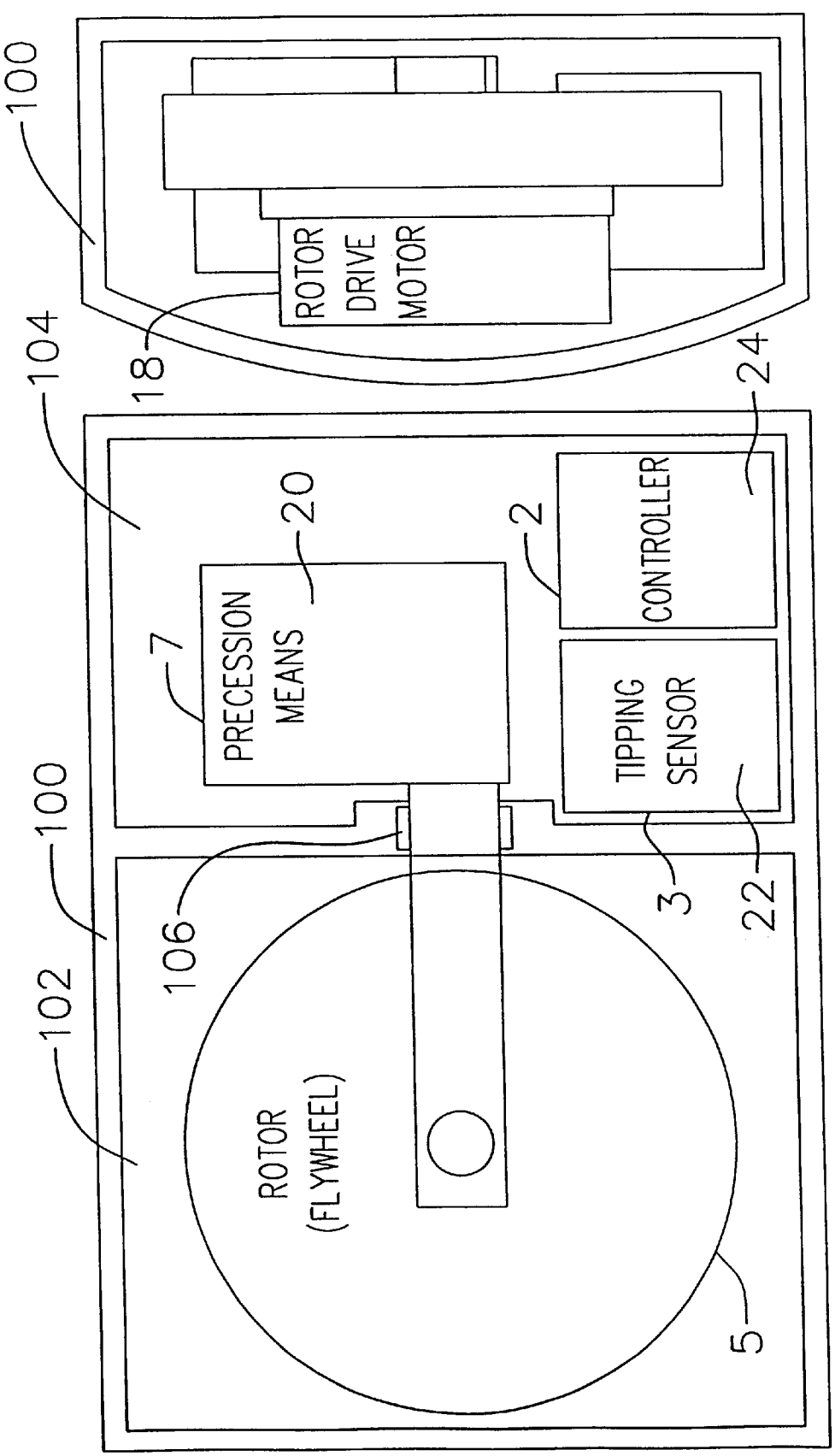

SYSTEM FOR BALANCING A TWO-WHEELED VEHICLE AT REST

CROSS-REFERENCE TO RELATED APPLICATION

This application claims priority and is based upon U.S. Provisional Patent Application No. 60/175,573 filed on Jan. 11, 2000.

FIELD OF THE INVENTION

The present invention relates to a system for balancing a two-wheeled vehicle and specifically to a system incorporating a selectively precessed spinning gyro rotor for balancing two-wheeled vehicles when about to stop or when stopped.

BACKGROUND OF THE INVENTION

Two-wheeled vehicles such as motorcycles and bicycles generally create gyroscopic forces while their wheels are rotating keeping these vehicles in balance. These vehicles become unstable and will tip on their sides when stopped unless the rider puts a foot on the ground or pavement for stability. This "grounding" of the rider is a nuisance which riders will go to great lengths to avoid. Putting a foot down is both objectively and subjectively undesirable in that it detracts from both the utility and sense of freedom of these vehicles.

The general use of gyros to stabilize a vehicle is known. However, these gyros tend to be continuously precessed in order to balance the vehicle. Consequently, these gyros are always generating forces interfering with the operation of such vehicles. As a result, two-wheeled vehicles incorporating these devices have problems when steering, especially when banking the vehicle to make a turn since the gyro generated forces will have the tendency to upright the vehicle thereby putting the rider in a dangerous situation.

Other gyros used to stabilize two-wheeled vehicles are coaxially mounted within the wheel of such vehicles. These spinning gyros are not precessed and therefore are ineffective in balancing the two-wheeled vehicle. Another problem with many gyro systems in use today is that they may be difficult to incorporate it into an existing vehicle.

As such, a system is needed for generating forces for keeping a two-wheeled vehicle in balance while at low speeds approaching a stop or when stopped and which do not generate forces when the vehicle is traveling so as to not interfere with the operation of the vehicle. Moreover, a system is needed that can be easily incorporated into existing vehicles.

SUMMARY OF THE INVENTION

A system for balancing two-wheeled vehicles is provided. The system includes a tipping sensor for detecting the incipient tipping of a two-wheeled vehicle. The system also includes a small gyro rotor typically weighing less than 10 pounds, a motor for spinning the gyro rotor, and a precessing device for precessing the gyro rotor about an velocity sensor or may receive input from the vehicle speed measuring equipment such as a speedometer. A controller receives information from the tipping and velocity sensors.

The system allows for the selective precession of the gyro rotor. The motor spins the gyro rotor at high RPMs, e.g., 25,000 RPM. When the two-wheeled vehicle is stopped or is about to come to a stop (i.e., when its speed is less than a minimum predetermined speed) and begins to tip, the tipping sensor senses the incipient tipping of the vehicle. Simultaneously, the controller activates the precessing device for rapidly precessing the spinning gyro rotor (e.g., 100 radians/sec. or more) in a direction for generating a force counterbalancing the tipping. The precession device then returns or allows the precesses gyro to return to its original non-precessed position. While the vehicle is traveling, the gyro rotor is not precessed thereby preventing the generation of forces that would interfere with the normal operation of the vehicle as in the case when the vehicle is tipped during turning.

By spinning the gyro rotor at high RPMs and precessing it at a high angular velocity, e.g., "hurrying" the precession to generate an appropriate anti-tipping force, a small gyro rotor may be used for balancing the two-wheeled vehicle when stopped or about to stop. As such, the inventive system can be packaged in a small package that can be purchased as a separate accessory for mounting onto an existing two-wheeled vehicle. To allow the gyro rotor to obtain high RPMs, it is preferred that the spinning gyro rotor is packaged in at least a partial vacuum. The system can also be incorporated into two-wheeled vehicles at the time of manufacture.

BRIEF DESCRIPTION OF THE DRAWINGS

FIG. 8A is a schematic view of a modular system for balancing two-wheeled vehicles of the present invention.

FIG. 8B is an end view of the modular system shown in FIG. 8A.

DETAILED DESCRIPTION

Figure 1:
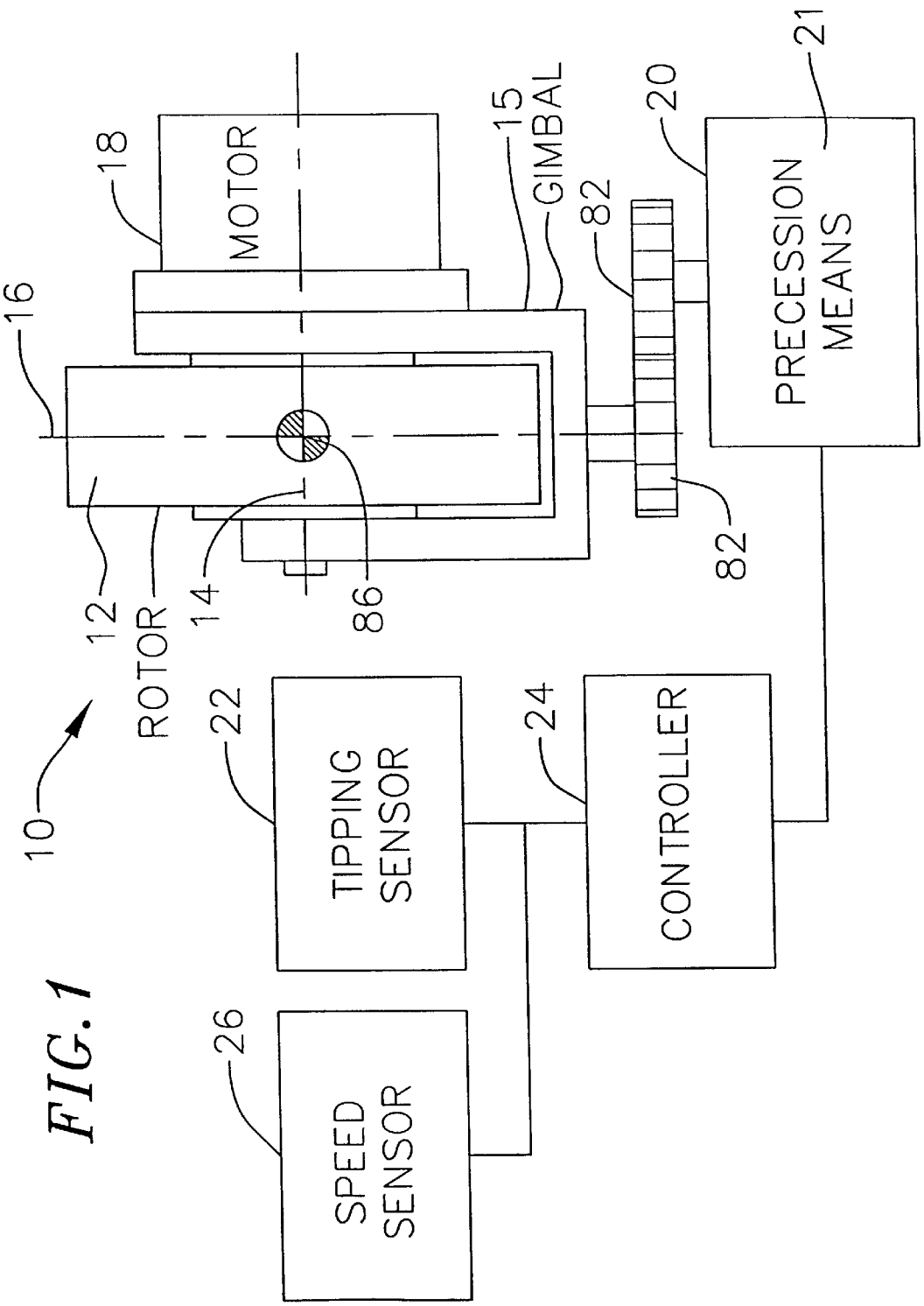
FIG. 1 is a schematic view of a two-wheeled vehicle balancing system of the present invention.
Figure 6:
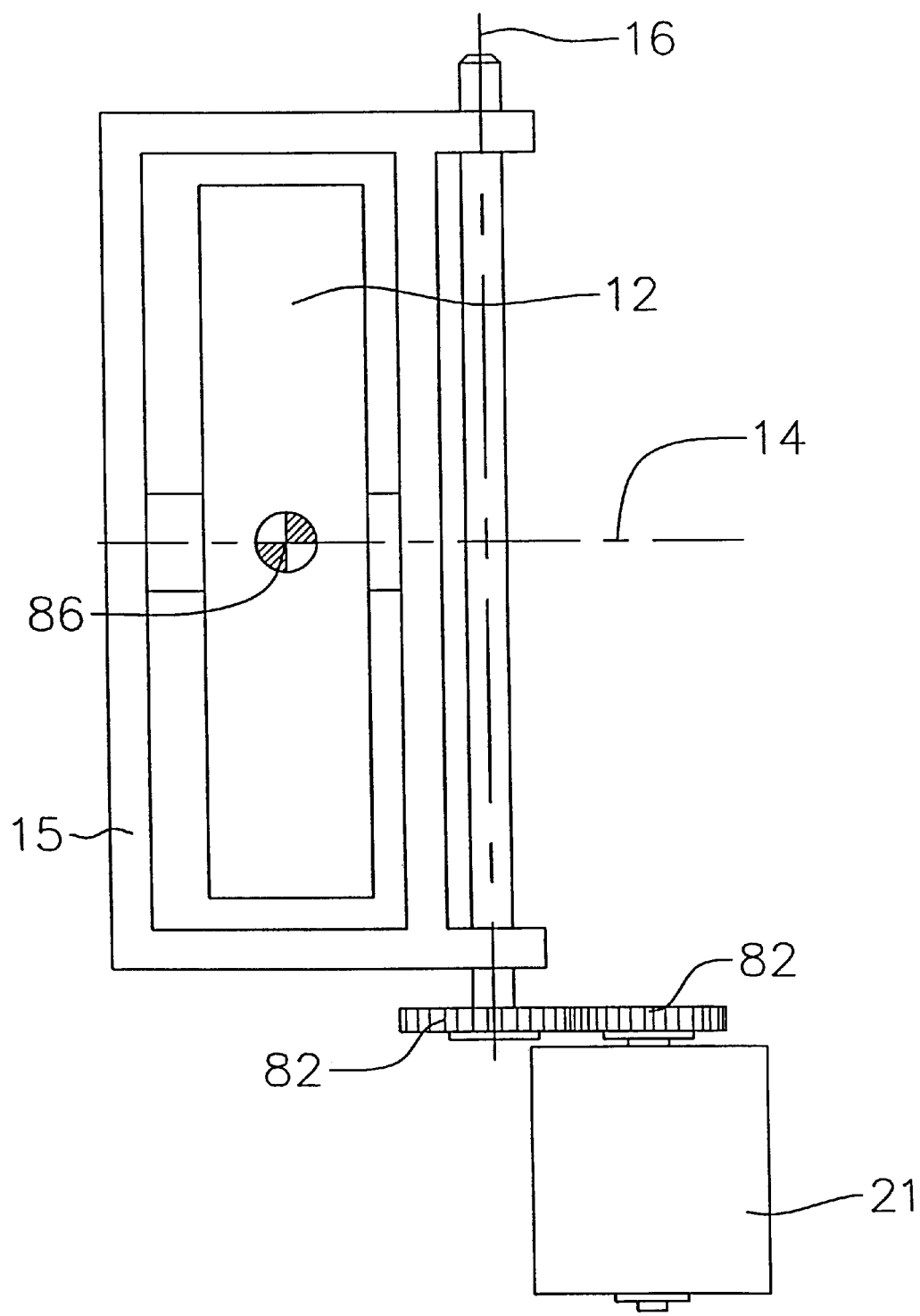
FIG. 6 is an end view of a gyro rotor and motor for precessing the gyro rotor about an axis offset from the center of gravity of the gyro rotor.

A two-wheeled vehicle balancing system 10 is provided that incorporates a small gyro rotor 12 typically weighing less than 10 lbs. (FIG. 1). The system is mounted on a two-wheeled vehicle. The rotor is mounted on the vehicle via a gimbal 15 so that it rotates about its central axis 14 and so that it can precess about a precess axis 16 perpendicular to the central axis. The precess axis may intersect the center of gravity 86 of the gyro rotor as shown in FIG. 1 or it may be offset from the center of gravity of the gyro rotor as shown in FIGS. 6 and 7B.

A motor 18, e.g., an electric motor is used to spin the rotor 12 mounted on the gyro gimbal 15. The electric motor may obtain electricity from the vehicle's electrical system or the vehicle's battery. A servo or other mechanical, electrical or electro-mechanical device 20 is used to rapidly precess the spinning gyro rotor about its precess axis 16. A tipping sensor 22. The system also includes a controller 24 which receives signals from the tipping sensor indicative of whether the vehicle is tipping. The controller is also coupled to a velocity sensor such as the vehicle's speedometer 26 from which it continuously receives signals indicative of the vehicle velocity.

The controller sends a signal to the precessing device 20 for precessing the gyro in a direction to counteract the vehicle tipping when the controller receives a signal from the velocity sensor indicating a vehicle velocity that is lower than a predetermined velocity and when it receives a signal from the tipping sensor denoting incipient tipping of the vehicle and the tipping direction. The predetermined velocity may be programmed into the controller. The predetermined velocity is preferably a low magnitude velocity such that a velocity magnitude below the predetermined velocity is indicative that the vehicle is close to being stopped.

As the two-wheeled vehicle slows down sufficiently and begins tipping, the system kicks in, i.e., the spinning gyro rotor is precessed generating a sufficient force to keep the vehicle upright while at slow speeds and while fully at rest. Typically, the precession of the gyro generates a force that is slightly greater than that needed to upright the vehicle, i.e., the gyro rotor is over precessed, thereby causing the vehicle to attempt to tip the other way. Consequently, the gyro rotor is precessed in the reverse direction to overcome such tipping. As a result, the gyro may be go through a series of rapid cyclic precessions for providing a sufficient force for keeping the vehicle upright. Typically, the cyclic precessions occur over a period less than several milliseconds. The gyro returns to its original non-precessed position between each precession. If the vehicle were to begin tipping again, as for example, when in a prolonged stop, the gyro rotor is again precessed to overcome the incipient tipping and returns to its original position after generating sufficient force for keeping the vehicle upright. The gyro rotor may be precessed and returned to its original position multiple times for maintaining the vehicle in an upright position when about to stop or when stopped. The gyro rotor may be continuously spun when the vehicle is in operation or it may be selectively spun as the vehicle speed drops below a preselected speed.

Figure 2:
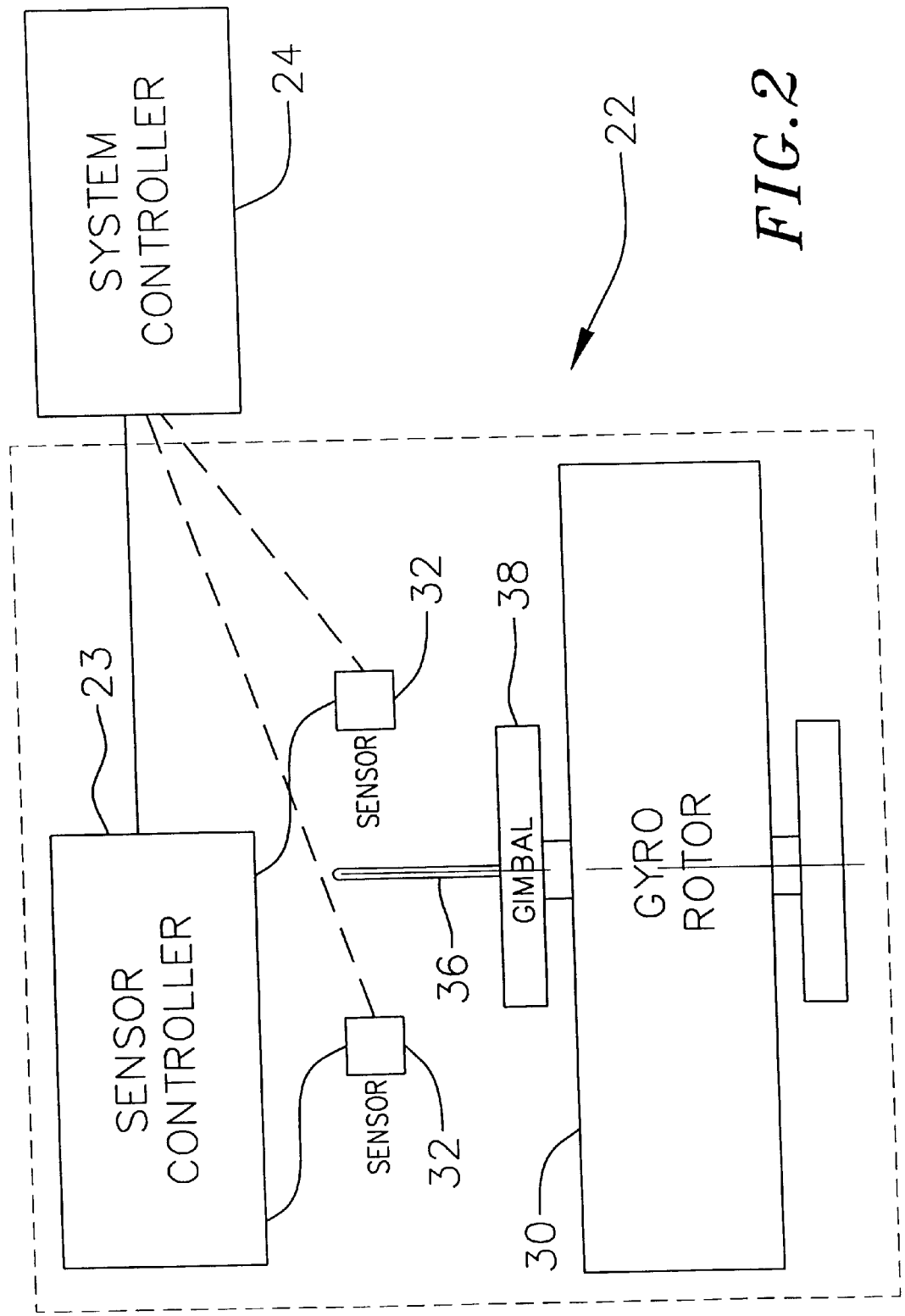
FIG. 2 is a schematic view of one embodiment tipping sensor incorporated in the present invention.

In one embodiment, the tipping sensor 22 comprises a spinning rate gyro rotor 30 (FIG. 2). As the vehicle tips, the spinning rate gyro maintains its position relative to the ground due to the forces it generates by spinning. Sensors 32 may be positioned so as to be contacted by a probe 36 extending from the gyro mounting frame or gimbal 38. As the vehicle tips in one direction, the probe 36 comes in contact with one of the sensors 32 and when the vehicle tips in the opposite direction the probe 36 comes into contact with the other sensor 32. The sensors 32 are coupled to a sensor controller 23 which ascertains which sensor 32 was contacted and which then sends a signal to the system controller 24 indicative of tilting and the direction of tilting. Alternatively, the sensors may be coupled directly to the system controller 24 as denoted by the dashed lines in FIG. 2. In an alternate embodiment, a circuit may be mounted on the rate gyro mounting frame or gimbal that is broken as the mounting frame or gimbal rotates as the vehicle tips. Such circuit may also be coupled to a sensor controller or may be coupled directly to the system controller 24.

Figure 3:
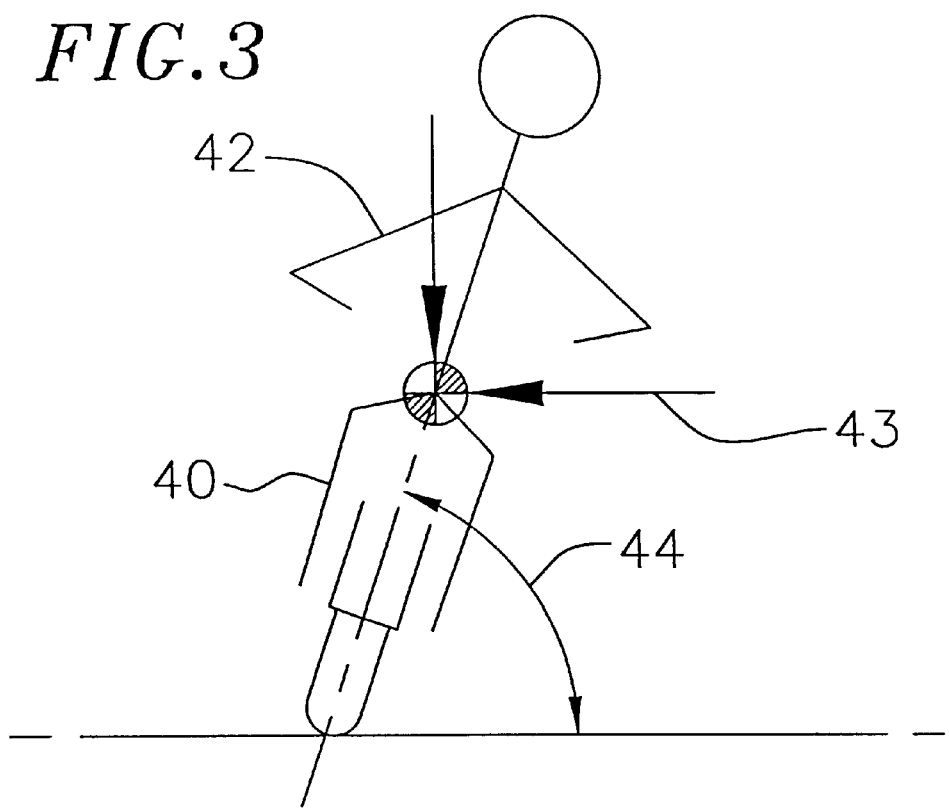
FIG. 3 is a front end view of a two-wheeled vehicle with rider in a tilted balanced condition maintained due to crosswinds.
Figure 4:
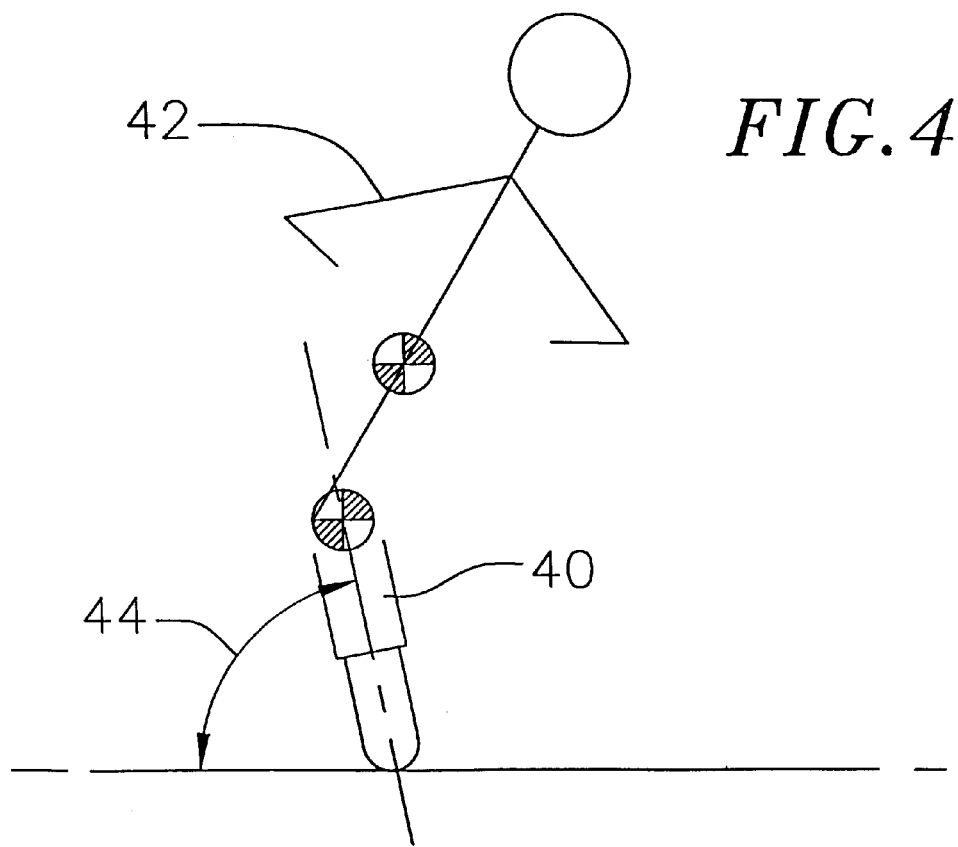
FIG. 4 is a front end view of a two-wheeled vehicle with rider in a tilted balanced condition due to a rider weight shift.

There may be situations where the two-wheeled vehicle 40 and rider 42 may be in a tilted position with the two-wheeled vehicle balanced. For example, as shown in FIG. 3, the two-wheeled vehicle may be balanced even though it is inclined relative to the pavement at an incline angle 44 less than 90°. This may occur when the vehicle is at rest and is subject to cross-wind 43. The cross-wind balances the vehicle in the inclined position depicted in FIG. 3. A balanced but not upright condition may also occur when a rider 42 of the two-wheeled vehicle 40 shifts his/her weight in one direction causing the vehicle to shift in the opposite direction for balancing the vehicle as shown in FIG. 4.

If the two-wheeled vehicle is about to stop or is stopped when the vehicle is tilted but balanced as described above, the tipping sensor would sense the incipient tipping and the system of the present invention would precess the spinning gyro rotor to upright the vehicle. However, when this occurs, the force provided by the precessing gyro rotor will tend to put the vehicle out of balance in the direction of the force provided by the precession of the gyro. Consequently, the gyro will then precess in the opposite direction by the system to overcome this unbalancing.

Once at the upright position, the force created by the wind 43 (FIG. 3) or by the weight of the shifted rider 42 (FIG. 4) will tend to put the vehicle out of balance. This will cause the system to precess the gyro rotor in the opposite direction from its previous precession. Consequently, the gyro will undergo cyclic precessions for maintaining the vehicle in a balanced position. In other words, the gyro will precess in one direction and then return to its original position, then precess in a second opposite direction and return to its original position, then precess in a direction opposite second direction and return in its original position, and so forth. In an effort to avoid the such cyclic precessions, a tipping sensor may be used that senses incipient tipping from a balanced position of the vehicle even when the vehicle is tilting, thus causing the system to apply corrective up-righting forces to the vehicle only when the vehicle is out of balance. In other words, such a tipping sensor senses relative tipping from a balanced tilted position.

Figure 5A:
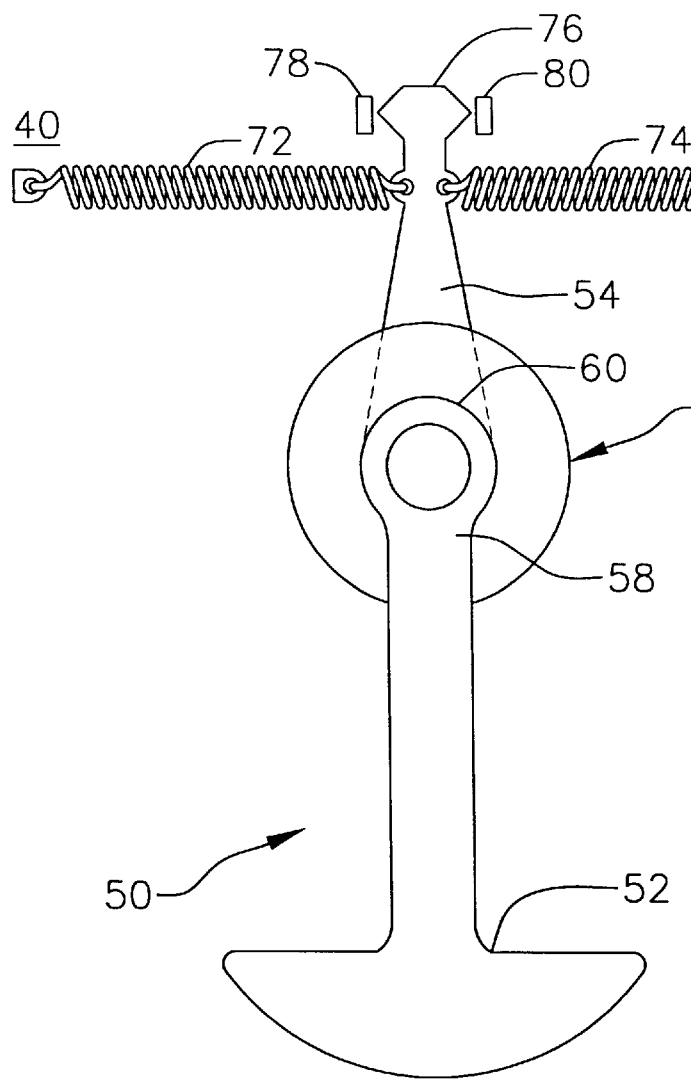
FIG. 5A is a front view of another embodiment tipping sensor incorporated in the present invention for sensing tipping of a two-wheeled vehicle from a balanced condition.
Figure 5B:
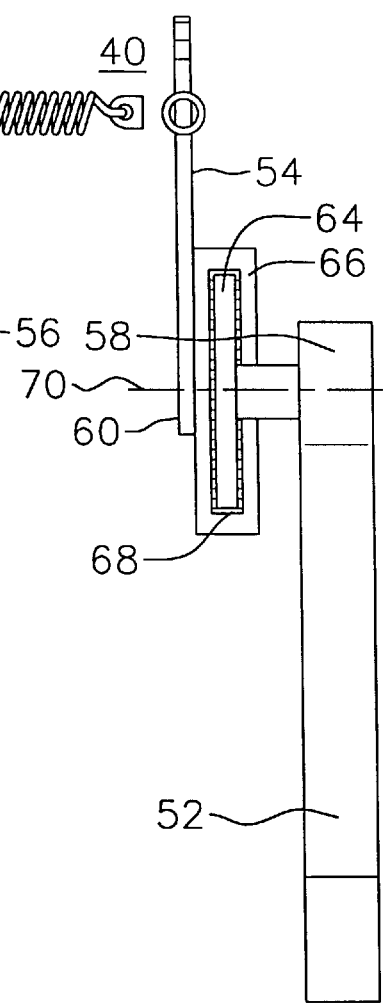
FIG. 5B is a side view of the tipping sensor shown in FIG. 5A.

One such sensor is a compensating pendulum sensor 50 shown in FIGS. 5A and 5B. This sensor comprises a compensating pendulum or gravity pendulum 52 which is basically a pendulum that maintains its orientation relative to the ground due to its inertia. The pendulum is mounted on the two-wheeled vehicle 40 such that it can pivot to maintain its orientation relative to the ground as the two-wheeled vehicle tips. This can be accomplished by mounting the pendulum such that it can pivot along a plane perpendicular to the longitudinal axis of the two-wheeled vehicle.

The compensating pendulum sensor also comprises a contact lever 54 that is coupled to the pendulum via a viscous fluid coupling 56. Typically the proximal ends 58 and 60 of the pendulum and contact lever, respectively are coupled to the viscous coupling 56 as shown in FIG. 5B such that they extend radially outward from the viscous coupling.

The viscous coupling comprises a first member 64 and a second member 66. The two members are rotationally coupled to each other by a viscous fluid 68. In the embodiment shown in FIG. 5B, the first member 64 is disk shaped member. The second member 66 defines a housing in the shape of a short cylinder. The first member 64 and the viscous fluid 68 are housed within the second member 66. In this regard, the first member 64 is surrounded by the viscous fluid. The first member is able to rotate relative to the second member subject to frictional constraints imposed by the viscous fluid.

The pendulum 52 is coupled to one member and the contact lever is coupled to the other member of the viscous coupling. In the embodiment shown in FIGS. 5A and 5B, the pendulum 52 is connected to the first member 64 and the contact lever 54 is connected to the second member 66 of the viscous coupling and are able to pivot i.e., rotate relative to each other about a pivot axis 70. The entire compensating pendulum sensor is pivotally coupled to the two-wheeled vehicle about the pivot axis 70.

Two opposing springs 72, 74 are coupled proximate the distal end 76 of the contact lever 54 and to the two-wheeled vehicle 40. The first spring 72 exerts a force on the contact lever opposite the force exerted by the second spring 74 so as to maintain contact lever in a balanced position between the two springs as shown in FIG. 5A. Two electrical contacts 78, 80 are situated on either side of the contact lever proximate the contact lever distal end 76 and are spaced apart from the contact lever when the lever is in a balanced condition. In this regard, as the contact lever pivots in one direction it will come in contact with one of the electrical contacts and when it pivots in the opposite direction it will come in contact with the other electrical contact. When in the balanced position, the contact lever is not in contact with any of the electrical contacts 78, 80. By monitoring or receiving a signal of contact between the contact lever and an electrical contact, a determination as to which direction the two-wheeled vehicle is tipping can be made. Contact of the contact lever with one of electrical contacts is indicative of tipping in one direction while contact with other contact is indicative of tipping in the opposite direction. The two contacts may be coupled to a tipping sensor controller or directly to the system controller.

As the two wheeled vehicle tips, it simultaneously causes the pendulum to rotate. As the pendulum rotates it causes the contact lever to also rotate in the same direction (e.g., clockwise or counter-clockwise) as the viscous fluid initially prevents (i.e., restricts) relative rotation between the two members of the viscous coupling. When the contact lever rotates it will come in contact with one of the electrical contacts while stretching one of the springs. The stretched spring, thus, provides a force for returning the contact lever back to the balanced position. If the two wheeled vehicle remains in the tilted position, as for example described herein in relation to FIGS. 3 and 4, the pendulum attempts to remain oriented to the ground while the contact lever is under a force created by the springs for maintaining the lever in the balanced position, thereby generating a torque between the two members of the viscous coupling which slowly overcomes the friction force of the viscous fluid. Consequently, the two members to rotate relative to each other such that the contact lever is caused to return to the balanced position by the stretched spring and is retained in the balanced position by the springs, while the pendulum is oriented to the ground. In this regard, if the two wheeled vehicle remains in a titled but balanced position, the compensating pendulum sensor will not provided a signal of incipient tipping and thereby will not instigate an unnecessary precession of the gyro and the creation of an unnecessary uprighting force.

Other types of viscous couplings may be incorporated with the compensating pendulum sensor described herein. Moreover, instead of extension springs (i.e., spring which provide a force when extended) compression springs (i.e., springs that provide a force when compressed) may be incorporated in the compensating pendulum sensor. Furthermore, other types of tipping sensors may be used that will not indicate a tipping of the two wheeled vehicle, when the vehicle is tilted but balanced.

In a further embodiment, a pendulum sensor not incorporating the viscous coupling may be used, i.e., the contact level may be connected or be integral with the pendulum for sensing tipping of the two-wheeled vehicle without compensating for tipping but balanced conditions of the two-wheeled vehicle. In addition other electrical, mechanical or electromechanical tipping sensors may be incorporated in the system.

The precessing device 20 for precessing the gyro can be a servo, a motor or one or more solenoids. In one embodiment as shown in FIGS. 1 and 6, a motor is used to precess the gyro rotor 12 about a precession axis 16 perpendicular to the spin axis 14 of the rotor. The motor 21 may be coupled to the gyro gimbal 15 via gears 82. The precession axis 16 may be through the center of gravity 86 of the gyro rotor 12 as shown in FIG. 1 or may be offset from the center 86 as shown in FIG. 6. When tipping is sensed by the tipping sensor 22, the controller 24 sends a signal to the motor for quickly precessing the gyro rotor for creating a force to counteract the tipping force and then immediately sends a second signal to the motor for returning the gyro rotor in its original non-precessed position. In the alternative, the motor may be of the type which would allow the precessed gyro rotor to return to its original position under its own gyroscopic inertia as for example when the motor does not receive a signal from the controller for precessing the gyro.

Figure 7A:
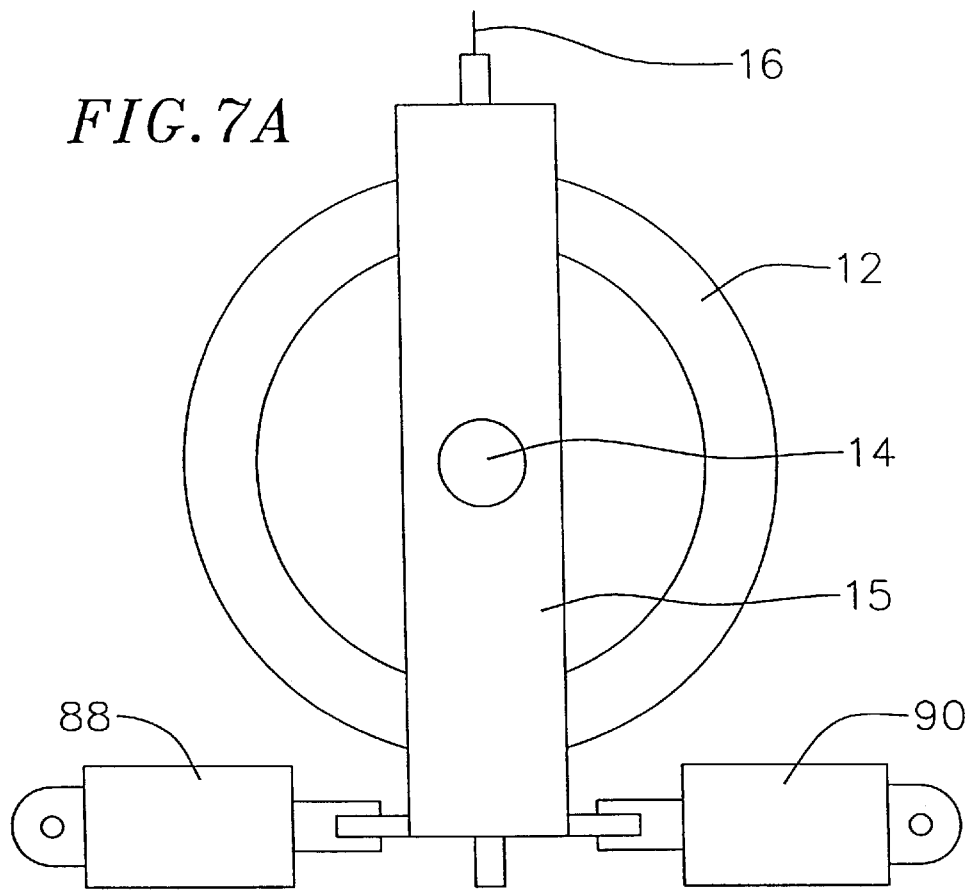
FIG. 7A is a side view of a gyro rotor on a gimbal which is coupled to two solenoids for rotating the gimbal and precessing the gyro rotor about an axis offset from the center of gravity of the gyro rotor.
Figure 7B:
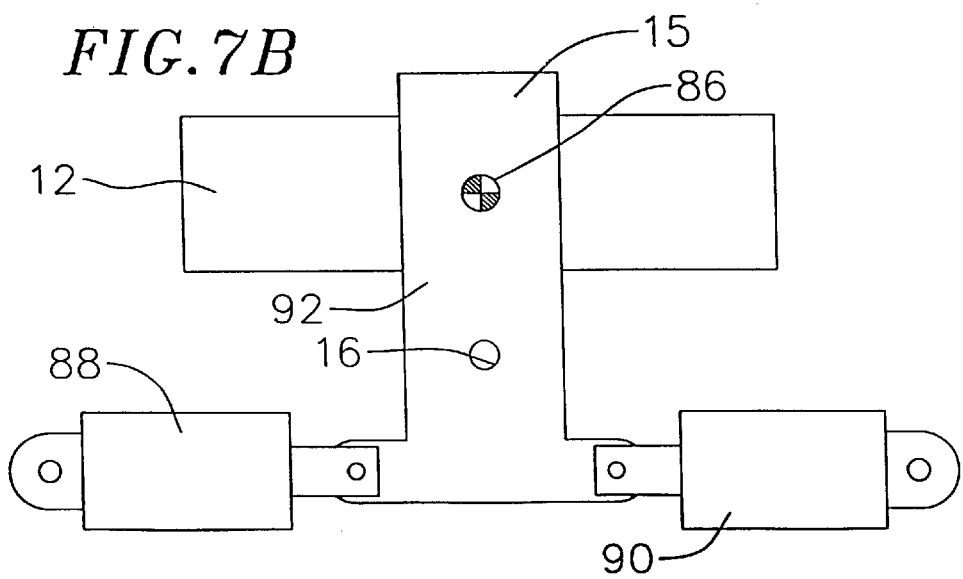
FIG. 7B is an end view of the gyro rotor with precession means shown in FIG. 7A.
Figure 9A:
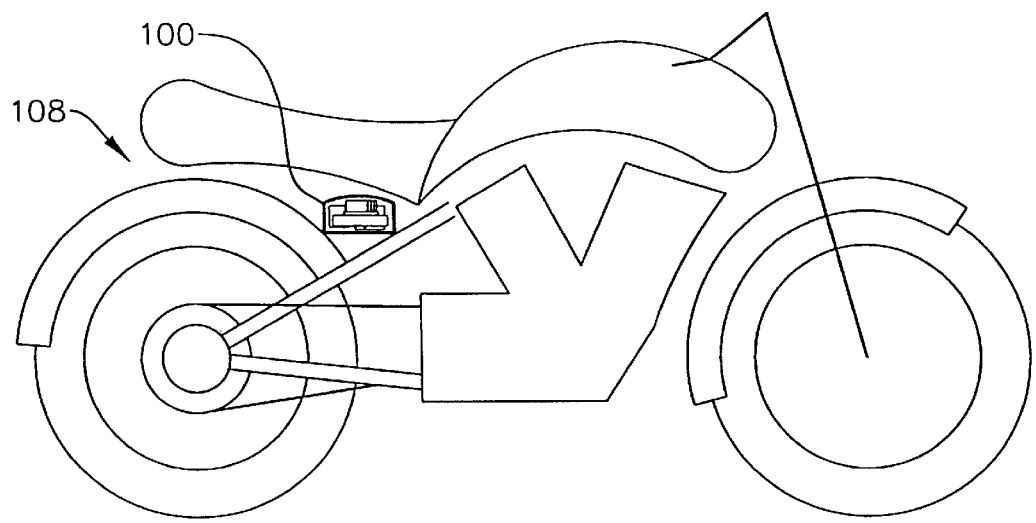
FIG. 9A is a side view of the motorcycle with a modular system of the present invention coupled to the motorcycle frame.
Figure 9B:
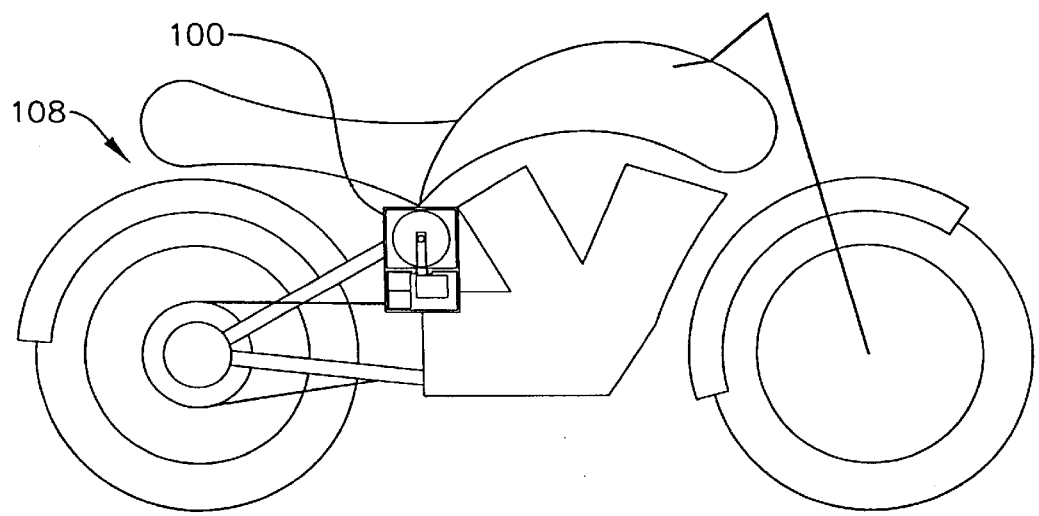
FIG. 9B is a side view of a motorcycle with a modular system of the present invention coupled to the motorcycle frame.

In an alternate embodiment shown in FIGS. 7A and 7B, two solenoids 88, 90 are used to precess the gyro. The solenoids may be of the type that extend or the type that retract when actuated. The two solenoids are oppositely coupled to the gyro gimbal 15 via a control arm 92. The control arm 92 is coupled to the gimbal 15 and extends from the gimbal in a direction preferably parallel to the spin axis 14 of the gyro. Specifically, the solenoids are oppositely coupled to the control arm 92 as shown in FIG. 7B. In this regard, when one solenoid is activated it causes the control arm and thus the gimbal and gyro rotor to precess in one direction and when the other solenoid is activated it causes control arm and thus the gimbal and the gyro rotor to precess in the opposite direction about a precess axis 16. When incipient tipping is sensed, the controller 24 sends a signal to one of the solenoids which extends (or retracts) for precessing the gyro to generate a force to counteract the tipping of the vehicle. Immediately a follow up signal is send to the other solenoid, which extends (or retracts) for precessing the gyro rotor back to its original non-precessed position.

In an alternate embodiment, one solenoid may be used which is coupled to the control arm 92 and which may be controlled for extending and retracting for precessing the gyro rotor in both directions and for returning the gyro rotor to its original non-precesses position. In yet a further embodiment, a single solenoid may be used which is coupled to the control arm and which either extends or retracts for precessing the gyro when receiving signal from the rotor and when it does not receive a signal it allows the rotor to return to its original non-precessed position under its own gyroscopic inertia.

By precessing the rotor only when the vehicle is about to stop or when the vehicle is stopped and by returning the precessed rotor to its original position after each precession, the system insures that anti-tipping forces are not provided by the system when the two-wheeled vehicle is in motion and is banked as for example during a turn. Furthermore, by providing the force to upright the two-wheeled vehicle upon incipient tipping, the force required to bring the vehicle to an upright position is minimized thus minimizing the size of the gyro rotor is minimized.

The physics of gyroscopic operation dictates that the rotor weight required for generating a predetermined force is a function of the rotor spinning RPMs, rotor diameter, rotor shape and precession rate (angular velocity) about an axis perpendicular to the spin axis in radiants per second "dv/dt". Reducing the rotor size is therefore a matter of increasing both the rotor RPMs and the precession rate. In a preferred embodiment of the present invention, the rotor is spun at high RPMs and a high precession rate is achieved. For example, a 5 inch diameter, 1 inch thick rotor spinning at 25,000 RPMs and having a precession rate of 100 radius per second would create a anti-tipping force in the order of 55 foot pounds. This force may be sufficient to counteract the incipient tipping forces of the vehicle as it comes to rest. To achieve high RPMs, the rotor is preferably housed and spun in a partial vacuum.

Consequently with the inventive system, a gyro rotor that weighs less than 10 lbs. is sufficient for generating the requisite forces. This is unlike traditional gyro rotors which are used to stabilize vehicles which typically have a weight of about 5% of the total vehicle weight. For example, in the case of a 900 lb. motorcycle and a 250 lb. rider, under conventional systems a 58 lb. gyro rotor would have to be used. With the present invention, however, a gyro rotor weighing less than 10 lbs. may be used to keep the same vehicle with rider balanced.

The entire gyro system described herein can be incorporated in a small module or housing 100 that can be easily attached to any two-wheeled vehicle FIGS. 8A, 8B, 9A and 9B. For example, the housing preferably includes a vacuum chamber 102, capable of achieving at least a partial vacuum, for housing the rotor so as to allow the rotor to spin at high RPMS. The motor 18 may also be housed in the vacuum chamber 102 as shown in FIG. 8B. The precession device 20, the tipping sensor 22 and the controller 24 may be housed in a separate chamber 104 as shown in FIG. 8A or may be housed in the vacuum chamber 102. If two chambers 102, 104 are incorporated in the module 100 as shown in FIG. 8A, a seal 106 is used around a portion of the gimbal 15 extending from the vacuum chamber 102 to the second chamber 104 for coupling with the precession device 20. The module can be mounted on a two-wheeled vehicle such as a motorcycle 108 chassis as for example shown in FIGS. 9A and 9B ensuring that the tipping sensor 22 is properly oriented for sensing incipient tipping. Input from the speedometer is then coupled to the controller. Alternatively, the module may incorporate its own velocity sensor so that it does not have to rely on the speedometer of the vehicle. As can be seen, the entire system could be an accessory that can be unobtrusively attached to the two-wheeled vehicle.

Although the present invention has been described and illustrated with respect to multiple embodiments thereof, it is to be understood that it is not to be so limited, since changes and modifications may be made therein which are within the full intended scope of this invention as hereinafter claimed.

What is claimed is:

1. A system for balance a two-wheeled vehicle when approaching rest or when at rest comprising:
    a gyro rotor;
    a motor for spinning the gyro rotor;
    a tipping sensor for sensing tipping of the vehicle;
    a precession means for precessing the gyro rotor from a non-precessed position to any of a plurality of precessed positions and for facilitating the return of the precessed gyro to the non-precessed position;
    a controller coupled to the tipping sensor and precession means and for receiving information relating to the velocity of the vehicle, wherein the controller controls the precessions means, wherein the precession means precesses the gyro from the non-precessed position to a precessed position when the tipping sensor has sensed tipping and when the velocity of the vehicle is not greater than a predetermined minimum velocity, and immediately returns the gyro rotor to the non-precessed position.

2. A system as recited in claim 1 wherein the precession means repeatedly precesses the gyro rotor from the non-precessed position to a precessed position and returns the gyro rotor to the non-precessed position if the tipping sensor continues to sense tipping of the vehicle when the velocity of the vehicle is not greater than a predetermined minimum velocity.

3. A system as recited in claim 2 wherein the tipping sensor can sense the direction of vehicle tipping.

4. A system as recited in claim 2 further comprising a housing encasing the gyro rotor, tipping sensor, motor and precession means, said housing and gyro, tipping sensor, precession means and motor defining a module for mounting on the vehicle.

5. A system as recited in claim 4 wherein the housing comprises at least a partial vacuum chamber and wherein the gyro rotor is housed within said at least partial vacuum chamber.

6. A system as recite in claim 2 wherein the precession means comprises a motor.

7. A system as recited in claim 2 wherein the precession means comprises a solenoid coupled to the rotor.

8. A system as recited in claim 7 wherein the precession means further comprises a second solenoid coupled to the rotor, wherein one solenoid precesses the rotor in one direction and the other solenoid precesses the rotor in the opposite direction.

9. A system as recited in claim 2 wherein the gyro rotor returns to the non-precessed position under its own gyroscopic inertia.

10. A system as recited in claim 2 wherein the tipping sensor comprises a gyro which maintains a position relative to a ground during tipping of the vehicle.

11. A system as recited in claim 2 wherein the tipping sensor comprises a pendulum, wherein the pendulum pivots to maintain its position relative to the ground during vehicle tipping.

12. A system as recited in claim 2 wherein the tipping sensor senses vehicle tipping relative to a balanced position.

13. A system as recited in claim 2 wherein the tipping sensor comprises:
    a viscous coupling;
    a pendulum coupled to the viscous coupling for maintaining it position relative to a ground during tipping of the vehicle;
    an arm coupled to the viscous coupling and extending opposite the pendulum, wherein the viscous coupling allows the arm to pivot relative to the pendulum;

a first spring coupled to an end of the arm distally from the viscous coupling, the first spring being capable of providing a first force for pivoting the arm in a first direction;

a second spring coupled to an end of the arm distally from the viscous coupling, the second spring being capable of providing a second force opposite the first force to the arm for pivoting the arm in a second direction opposite the first direction;

a first contact coupled to the controller; and a second contact opposite the first contact and coupled to the controller, wherein contact of the arm with the first contact is indicative of vehicle tipping in one direction and wherein contact of the arm with second contact is indicative of vehicle tipping in the opposite direction.

14. A system as recited in claim 2 wherein the gyro rotor has a weight not greater than 10 lbs.

15. A system as recited in claim 2 further comprising a velocity sensor coupled to the controller for sending information to the controller relating to the velocity of the vehicle.

16. A self-balancing two-wheeled vehicle comprising:
a vehicle body;
a gyro rotor coupled to the body;
a velocity sensor;
a motor for spinning the gyro rotor;
a tipping sensor coupled to the body for sensing tipping of the vehicle;
a precession means for precessing the gyro rotor from a non-precessed position to any of a plurality of precessed positions and for facilitating the return of the precessed gyro to the non-precessed position;
a controller coupled to the tipping sensor, the velocity sensor and precession means, wherein the controller controls the precessions means, wherein the precession mean precesses the gyro from the non-precessed position to a precessed position when the tipping sensor has sensed tipping and when the velocity of the vehicle is not greater than a predetermined minimum velocity, and immediately returns the gyro rotor to the non-precessed position.

17. A two-wheeled vehicle as recited in claim 16 wherein the precession means repeatedly precesses the gyro rotor from the non-precessed position to a precessed position and returns the gyro rotor to the non-precessed position if the tipping sensor continues to sense tipping of the vehicle when the velocity of the vehicle is not greater than a predetermined minimum velocity.

18. A two-wheeled vehicle as recited in claim 17 wherein the tipping sensor can sense the direction of tipping.

19. A two-wheeled vehicle as recited in claim 17 further comprising a housing mounted on the vehicle and encasing the gyro rotor, tipping sensor, precession means and motor, said housing and gyro, tipping sensor, precession means and motor defining a module mounted on the vehicle.

20. A two-wheeled vehicle as recited in claim 19 wherein the housing comprises at least a partial vacuum chamber and wherein the gyro rotor is housed within said at least partial vacuum chamber.

21. A two-wheeled vehicle as recite in claim 17 wherein the precession means comprises a motor.

22. A two-wheeled vehicle as recited in claim 17 wherein the precession means comprises a solenoid coupled to the rotor.

23. A two-wheeled vehicle as recited in claim 22 wherein the precession means further comprises a second solenoid coupled to the rotor, wherein one solenoid precesses the rotor in one direction and the other solenoid precesses the rotor in the opposite direction.

24. A two-wheeled vehicle as recited in claim 17 wherein the gyro rotor returns to the non-precessed position under its own gyroscopic inertia.

25. A two-wheeled vehicle as recited in claim 17 wherein the tipping sensor comprises a gyro which maintains a position relative to a ground during tipping of the vehicle.

26. A two-wheeled vehicle as recited in claim 17 wherein the tipping sensor comprises a pendulum pivotally coupled to the vehicle, wherein the pendulum pivots to maintain its position relative to the ground during tipping.

27. A two-wheeled vehicle as recited in claim 17 wherein the tipping sensor senses vehicle tipping relative to a balanced tilted position of the vehicle.

28. A two-wheeled vehicle as recited in claim 17 wherein the tipping sensor comprises:
a viscous coupling;
a pendulum coupled to the viscous coupling for maintaining it position relative to a ground during tipping of the vehicle;
an arm coupled to the viscous coupling and extending opposite the pendulum, wherein the viscous coupling allows the arm to pivot relative to the pendulum;
a first spring coupled to an end of the arm distally from the viscous coupling and to the vehicle, the first spring being capable of providing a first force for pivoting the arm in a first direction;
a second spring coupled to an end of the arm distally from the viscous coupling and to the vehicle, the second spring being capable of providing a second force opposite the first force to the arm for pivoting the arm in a second direction opposite the first direction;
a first contact coupled to the controller; and
a second contact opposite the first contact and coupled to the controller, wherein contact of the arm with the first contact is indicative of vehicle tipping in one direction and wherein contact of the arm with the second contact is indicative of vehicle tipping in the opposite direction.

29. A two-wheeled vehicle as recited in claim 17 wherein the gyro rotor has a weight not greater than 10 lbs.

30. A method for preventing the tipping of a two-wheeled vehicle coming to rest or when at rest comprising the steps of:
measuring the speed of the vehicle;
sensing tipping of the vehicle;
spinning a gyro rotor coupled to the vehicle about a spin axis;
precessing the gyro rotor to a precessed position from a non-precessed position about a precession axis perpendicular to said spin axis and in direction to generate a force to counteract the tipping of the vehicle when the sensed speed of the vehicle is not greater than a predetermined minimum speed and when tipping of the vehicle has been sensed; and
immediately returning the precessed gyro to the non-precessed position.

31. A method as recited in claim 30 further comprising the steps of repeatedly precessing and returning the precessed gyro rotor to the non-precessed position for maintaining the two-wheeled vehicle balanced when coming to rest or when at rest.

32. A method as recited in claim 31 wherein the step of precessing comprises precessing of the spinning gyro when the vehicle tips from a balanced position.

33. A method as recited in claim 31 wherein the step of precessing comprises precessing the spinning gyro when the vehicle tips from a balanced tilted position.

34. A method as recited in claim 31 wherein the step of sensing comprises sensing of vehicle tipping relative to a balanced tilted position of the vehicle.

35. A system for balancing a two-wheeled vehicle when approaching rest or when at rest comprising:
- a gyro rotor;
- a motor for spinning the gyro rotor;
- a tipping sensor for sensing tipping of the vehicle;
- first and second solenoids coupled to the gyro rotor for precessing the gyro rotor from a first not precessed position to a second precessed position and for facilitating the return of the precessed gyro to the first position, wherein the first solenoid precesses the rotor in one direction and the second solenoid precesses the rotor in the opposite direction; and
- a controller coupled to the tipping sensor and precession means and for receiving information relating to the velocity of the vehicle, wherein the controller controls the solenoids, wherein the solenoids precess the gyro from the first to the second position when the tipping sensor has sensed tipping and when the velocity of the vehicle is not greater than a predetermined minimum velocity, and immediately return the gyro rotor from the second to the first position.

36. A system for balancing a two-wheeled vehicle when approaching rest or when at rest comprising:
- a gyro rotor;
- a motor for spinning the gyro rotor;
- a tipping sensor for sensing tipping of the vehicle, the tipping sensor comprising,
  - a viscous coupling,
  - a pendulum coupled to the viscous coupling for maintaining it position relative to a ground during tipping of the vehicle,
  - an arm coupled to the viscous coupling and extending opposite the pendulum, wherein the viscous coupling allows the arm to pivot relative to the pendulum,
  - a first spring coupled to an end of the arm distally from the viscous coupling, the first spring being capable of providing a first force for pivoting the arm in a first direction,
  - a second spring coupled to an end of the arm distally from the viscous coupling, the second spring being capable of providing a second force opposite the first force to the arm for pivoting the arm in a second direction opposite the first direction,
  - a first contact coupled to the controller, and
  - a second contact opposite the first contact and coupled to the controller, wherein contact of the arm with the first contact is indicative of vehicle tipping in one direction and wherein contact of the arm with the second contact is indicative of vehicle tipping in the opposite direction;
- a precession means for precessing the gyro rotor from a first not precessed position to a second precessed position and for facilitating the return of the precessed gyro to the first position;
- a controller coupled to the tipping sensor and precession means and for receiving information relating to the velocity of the vehicle, wherein the controller controls the precessions means, wherein the precession mean precesses the gyro from the first to the second position when the tipping sensor has sensed tipping and when the velocity of the vehicle is not greater than a predetermined minimum velocity, and immediately returns the gyro rotor from the second to the first position.

37. A self-balancing two-wheeled vehicle comprising:
- a vehicle body;
- a gyro rotor coupled to the body;
- a vehicle velocity sensor;
- a motor for spinning the gyro rotor;
- a tipping sensor coupled to the body for sensing tipping of the vehicle;
- first and second solenoids for precessing the gyro rotor from a first not precessed position to a second precessed position and for facilitating the return of the precessed gyro to the first position, wherein the first solenoid precesses the rotor in one direction and the second solenoid precesses the rotor in the opposite direction;
- a controller coupled to the tipping sensor, the velocity sensor and precession means, wherein the controller controls the solenoids, wherein the solenoids precess the gyro from the first to the second position when the tipping sensor has sensed tipping and when the velocity of the vehicle is not greater than a predetermined minimum velocity, and immediately returns the gyro rotor from the second to the first position.

38. A self-balancing two-wheeled vehicle comprising:
- a vehicle body;
- a gyro rotor coupled to the body;
- a vehicle velocity sensor;
- a motor for spinning the gyro rotor;
- a tipping sensor coupled to the body for sensing tipping of the vehicle, the tipping sensor comprising,
  - a viscous coupling,
  - a pendulum coupled to the viscous coupling for maintaining it position relative to a ground during tipping of the vehicle,
  - an arm coupled to the viscous coupling and extending opposite the pendulum, wherein the viscous coupling allows the arm to pivot relative to the pendulum,
  - a first spring coupled to an end of the arm distally from the viscous coupling and to the vehicle, the first spring being capable of providing a first force for pivoting the arm in a first direction,
  - a second spring coupled to an end of the arm distally from the viscous coupling and to the vehicle, the second spring being capable of providing a second force opposite the first force to the arm for pivoting the arm in a second direction opposite the first direction,
  - a first contact coupled to the controller, and
  - a second contact opposite the first contact and coupled to the controller, wherein contact of the arm with the first contact is indicative of vehicle tipping in one direction and wherein contact of the arm with the second contact is indicative of vehicle tipping in the opposite direction;
- a precession means for precessing the gyro rotor from a first not precessed position to a second precessed position and for facilitating the return of the precessed gyro to the first position;

a controller coupled to the tipping sensor, the velocity sensor and precession means, wherein the controller controls the precessions means, wherein the precession mean precesses the gyro from the first to the second position when the tipping sensor has sensed tipping and when the velocity of the vehicle is not greater than a predetermined minimum velocity, and immediately returns the gyro rotor from the second to the first position.

39. A system for balancing a two-wheeled vehicle when approaching rest or when at rest comprising:

a gyro rotor;

a motor for spinning the gyro rotor;

a tipping sensor for sensing tipping of the vehicle;

a motor for precessing the gyro rotor from a non-precessed position to any of a plurality of precessed positions and for facilitating the return of the precessed gyro to the non-precessed position;

a controller coupled to the tipping sensor and to the motor and for receiving information relating to the velocity of the vehicle, wherein the controller controls the motor, wherein the motor precesses the gyro from the non-precessed position to a precessed position when the tipping sensor has sensed tipping and when the velocity of the vehicle is not greater than a predetermined minimum velocity, and immediately returns the gyro rotor to the non-precessed position, and wherein the motor repeatedly precesses the gyro rotor from the non-precessed position to a precessed position and returns the gyro rotor to the non-precessed position if the tipping sensor continues to sense tipping of the vehicle when the velocity of the vehicle is not greater than a predetermined minimum velocity.

* * * * *